(12) United States Patent
Chiang et al.

(10) Patent No.: US 11,296,329 B2
(45) Date of Patent: Apr. 5, 2022

(54) METAL-ION BATTERY

(71) Applicant: Industrial Technology Research Institute, Hsinchu (TW)

(72) Inventors: Chien-Chih Chiang, New Taipei (TW); Kuang-Yao Chen, Ji'an Township, Hualien County (TW); Chun-Hsing Wu, Taipei (TW); Chang-Chung Yang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 473 days.

(21) Appl. No.: 15/813,791

(22) Filed: Nov. 15, 2017

(65) Prior Publication Data
US 2018/0175399 A1 Jun. 21, 2018

(30) Foreign Application Priority Data

Dec. 16, 2016 (TW) .................................. 105141740

(51) Int. Cl.
*H01M 10/0569* (2010.01)
*H01M 10/42* (2006.01)
(Continued)

(52) U.S. Cl.
CPC ......... *H01M 6/045* (2013.01); *H01M 4/0404* (2013.01); *H01M 4/134* (2013.01);
(Continued)

(58) Field of Classification Search
None
See application file for complete search history.

(56) References Cited

U.S. PATENT DOCUMENTS 5,415,949 A * 5/1995 Stone ..................... H01M 2/18
429/406
6,589,692 B2 7/2003 Takami
(Continued)

FOREIGN PATENT DOCUMENTS

CN 101645500 A 2/2010
CN 101662020 A 3/2010
(Continued)

OTHER PUBLICATIONS

Yue et al., A Promising Method for Electrodeposition of Aluminum on Stainless Steel in Ionic Liquid, AIChE Journal, Mar. 2009 vol. 55, No. 3, p. 783-796; https://doi.org/10.1002/aic.11698 (Year: 2009).*

(Continued)

*Primary Examiner* — Ula C Ruddock
*Assistant Examiner* — Anna Korovina
(74) *Attorney, Agent, or Firm* — Birch, Stewart, Kolash & Birch, LLP

(57) ABSTRACT

A metal-ion battery is provided. The metal-ion secondary battery includes a first chamber, a second chamber, and a control element. A positive electrode, a negative electrode, a separator disposed between the positive electrode and the negative electrode, and a first electrolyte are disposed within the first chamber. A second electrolyte is disposed within the second chamber, and wherein components and/or concentration of the first electrolyte are different from those of the second electrolyte. The control element determines whether to introduce the second electrolyte disposed within the second chamber into the first chamber via a first pipeline.

17 Claims, 9 Drawing Sheets

(51) Int. Cl.
    *H01M 10/0568* (2010.01)
    *H01M 10/48* (2006.01)
    *H01M 50/77* (2021.01)
    *H01M 6/04* (2006.01)
    *H01M 10/054* (2010.01)
    *H01M 6/06* (2006.01)
    *H01M 4/134* (2010.01)
    *H01M 4/1395* (2010.01)
    *H01M 4/04* (2006.01)
    *H01M 4/66* (2006.01)
    *H01M 4/02* (2006.01)

(52) U.S. Cl.
    CPC ........... *H01M 4/1395* (2013.01); *H01M 6/06* (2013.01); *H01M 10/054* (2013.01); *H01M 10/0568* (2013.01); *H01M 10/0569* (2013.01); *H01M 10/42* (2013.01); *H01M 10/425* (2013.01); *H01M 4/663* (2013.01); *H01M 2004/027* (2013.01); *H01M 2300/0045* (2013.01)

(56) References Cited

U.S. PATENT DOCUMENTS

| | | | |
|---|---|---|---|
| 2010/0124691 A1* | 5/2010 | Harris | H01M 2/361 429/50 |
| 2010/0316914 A1 | 12/2010 | Correia | |
| 2012/0082904 A1 | 4/2012 | Brown et al. | |
| 2012/0082905 A1 | 4/2012 | Brown et al. | |
| 2013/0177786 A1* | 7/2013 | Prochazka, Jr. | H01M 10/0486 429/53 |
| 2014/0242457 A1 | 8/2014 | Archer et al. | |
| 2014/0315049 A1* | 10/2014 | Wegner | H01M 10/0565 429/50 |
| 2014/0346050 A1 | 11/2014 | Sakaida et al. | |
| 2015/0249261 A1 | 9/2015 | Dai et al. | |
| 2016/0108534 A1 | 4/2016 | Dai et al. | |

FOREIGN PATENT DOCUMENTS

| | | |
|---|---|---|
| CN | 101764254 A | 6/2010 |
| CN | 101764256 A | 6/2010 |
| CN | 101794907 A | 8/2010 |
| CN | 103296246 A | 9/2013 |
| CN | 103825045 A | 5/2014 |
| CN | 103915611 A | 7/2014 |
| CN | 104025344 A | 9/2014 |
| CN | 104183835 A | 12/2014 |
| CN | 104201350 A | 12/2014 |
| CN | 104241596 A | 12/2014 |
| CN | 104393290 A | 3/2015 |
| CN | 104701541 A | 6/2015 |
| CN | 104810544 A | 7/2015 |
| CN | 104868179 A | 8/2015 |
| CN | 104952629 A | 9/2015 |
| CN | 104993130 A | 10/2015 |
| CN | 204857848 U | 12/2015 |
| JP | 11-233109 A | 8/1999 |
| JP | 2009-32400 A | 2/2009 |
| JP | 2014-222609 A | 11/2014 |
| KR | 10-2014-0076589 A | 6/2014 |
| TW | 201543733 A | 11/2015 |
| WO | WO 2012/044678 A2 | 4/2012 |
| WO | WO 2013/049097 A1 | 4/2013 |
| WO | WO 2015/131132 A1 | 9/2015 |

OTHER PUBLICATIONS

Chinese Office Action and Search Report dated May 21, 2019, for corresponding Chinese Application No. 201711008676.5.

* cited by examiner

METAL-ION BATTERY

CROSS REFERENCE TO RELATED APPLICATIONS

The application is based on, and claims priority from, Taiwan Application Serial Number 105141740, filed on Dec. 16, 2016, the disclosure of which is hereby incorporated by reference herein in its entirety.

TECHNICAL FIELD

The technical field relates to an energy storage device, and in particular to a metal-ion secondary battery.

BACKGROUND

Aluminum is the most abundant metal on earth, and electronic devices made of aluminum have the advantage of costing little. An aluminum-based redox couple, which involves three electron transfers during electrochemical charge/discharge reactions, provides relatively high storage capacity. Additionally, because of its lower reactivity and flammability, such an aluminum-ion battery might offer significant safety improvements.

However, conventional electrolytes used in metal-ion batteries are designed to be used at room temperature. When a metal-ion battery employing conventional electrolytes is operated at a low temperature, premature battery failure will occur. Furthermore, when a metal-ion battery employing an electrolyte that is designed to be used at low temperatures is operated at room temperature, premature battery failure will also occur.

Therefore, there is a need to develop a novel metal-ion battery for solving the aforementioned problems.

SUMMARY

According to embodiments of the disclosure, the disclosure provides an energy storage device, such as metal-ion battery. The metal-ion battery includes a first chamber including a positive electrode, a negative electrode, a separator, and a first electrolyte disposed within the first chamber, and wherein the first electrolyte comprises a first ionic liquid and a first metal halide. The separator can be disposed between the positive electrode and the negative electrode. The metal-ion battery includes a second chamber including a second electrolyte disposed within the second chamber, and wherein the second electrolyte consists of a second metal halide or the second electrolyte comprises a second metal halide and a second ionic liquid. In particular, components and/or concentration of the first electrolyte are different from those of the second electrolyte. The metal-ion battery includes a control element, wherein the control element is used to determine whether to introduce the second electrolyte disposed within the second chamber into the first chamber via a first pipeline. The molar ratio of the second metal halide to the second ionic liquid is greater than the molar ratio of the first metal halide to the first ionic liquid when the second electrolyte comprises the second metal halide and the second ionic liquid A detailed description is given in the following embodiments with reference to the accompanying drawings.

DETAILED DESCRIPTION

Figure 1:
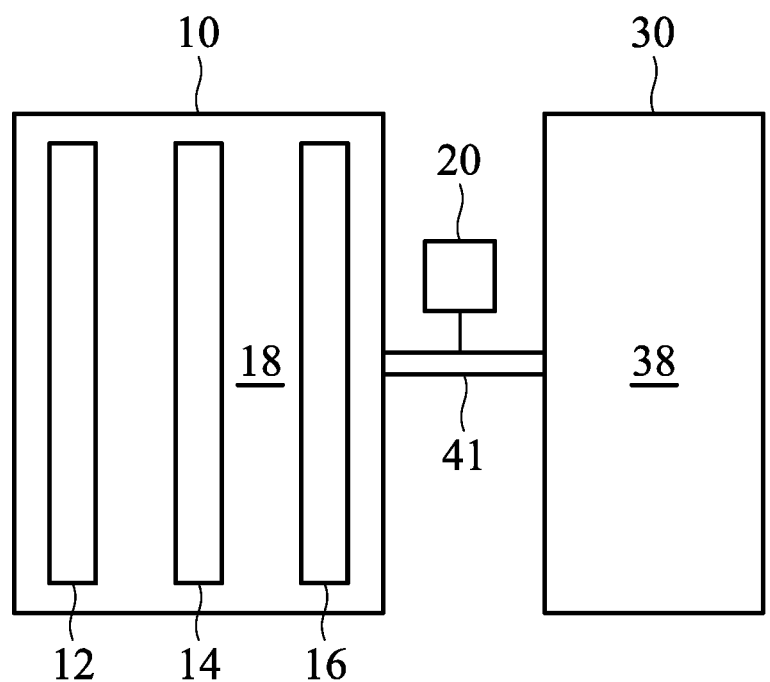
FIG. 1 is a block schematic diagram of a metal-ion battery according to an embodiment of the disclosure.

In the following detailed description, for the purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

The disclosure provides a metal-ion battery. According to embodiments of the disclosure, besides the first chamber (serving as the cell chamber for undergoing electrochemical reaction) (having a first electrolyte disposed within the first chamber), the metal-ion battery of the disclosure includes a second chamber (having a second electrolyte disposed within the second chamber) serving as a supplemental chamber for providing the electrolyte, wherein components and/or concentration of the first electrolyte are different from those of the second electrolyte. Therefore, the second electrolyte is automatically or manually introduced into the first chamber of the metal battery by means of the control element, and thus the metal-ion battery can be optimally adjusted according to the operating environment.

In addition, according to embodiments of the disclosure, the metal-ion battery may additionally include a third chamber having a third electrolyte disposed within the third chamber. The third chamber also serves as a supplemental chamber for providing the electrolyte, wherein components and/or concentration of the first electrolyte, second electrolyte and third electrolyte are different from each other. Therefore, the third electrolyte is automatically or manually introduced into the first chamber of the metal battery by means of the control element, and thus the metal-ion battery can be optimally adjusted according to the operating environment.

For example, when the metal-ion battery of the disclosure cannot be operated due to a physical phase change of the first electrolyte resulting from the low temperature of the operating environment (such as less than −35° C.), the second electrolyte can be introduced into the first chamber via the control element in order to increase the molar ratio of the metal halide to the ionic liquid of the electrolyte within the first chamber. Thus, the metal-ion battery can be operated at low temperatures.

When the temperature of the operating environment rises to a normal operating temperature for the metal-ion battery (such as from 0 to 40° C.), the third electrolyte can be introduced into the first chamber via the control element in order to decrease the molar ratio of the metal halide to the ionic liquid of the electrolyte within the first chamber. Thus, the metal-ion battery can be operated at normal temperatures.

Moreover, according to embodiments of the disclosure, after the metal-ion battery of the disclosure is operated for a period of time, the second electrolyte and/or third electrolyte can be introduced into the first chamber via the control element in order to revert the molar ratio of the metal halide to the ionic liquid of the electrolyte to the initial set value or the value at which the metal-ion battery exhibits high performance. Thus, the capacity of the metal-ion battery of the disclosure can recover to its original capacity, thereby extending the lifetime of the metal-ion battery.

FIG. 1 is a block schematic diagram of a metal-ion battery 100 according to an embodiment of the disclosure. The metal-ion battery 100 can be a rechargeable secondary battery, although primary batteries also are encompassed by the disclosure. The metal-ion battery 100 can include a first chamber 10, a second chamber 30, a control element 20, and a first pipeline 41. The first chamber 10 can include a positive electrode 12, a separator 14, a negative electrode 16, and a first electrolyte 18 disposed within the first chamber 10, wherein the separator 14 is disposed between the positive electrode 12 and the negative electrode 16. The separator 14 can mitigate against electrical shorting of the positive electrode 12 and the negative electrode 16. The second chamber 30 can include a second electrolyte 38, wherein components and/or concentration of the first electrolyte 18 are different from those of the second electrolyte 38. The first pipeline 41 is disposed between the first chamber 10 and the second chamber 30, wherein the control element 20 determines whether to introduce the second electrolyte 38 disposed within the second chamber 30 into the first chamber 10 via the first pipeline 41. It should be noted that components and/or concentration of the first electrolyte 18 are different from those of the second electrolyte 38. According to embodiments of the disclosure, the first pipeline 41 can be a unidirectional pipeline. Namely, the electrolyte merely flows into the first chamber 10 from the second chamber 30 via the first pipeline 41. The electrolyte within the first chamber 10 cannot flow into the second chamber 30 via the first pipeline 41.

Namely, the first pipeline 41 is a flow-in pipeline with respect to the first chamber, and the first pipeline 41 is a flow-out pipeline with respect to the second chamber 30. As a result, the second electrolyte 38 disposed within the second chamber 30 can be introduced into the first chamber 10 via the first pipeline 41, and the first electrolyte 18 disposed within the first chamber 10 cannot be introduced into the second chamber 30 via the first pipeline 41.

In addition, according to embodiments of the disclosure, the components and/or concentration of the electrolyte disposed within the first chamber 10 can be adjusted by introducing the second electrolyte 38 disposed within the second chamber 30 into the first chamber 10. Therefore, except for the first pipeline 41, there is no other pipeline between the first chamber 10 and the second chamber 30 for the electrolyte to proceed from the first chamber 10 to the second chamber 30. Namely, there is no flow-out pipeline (with respect to the first chamber 10) between the first chamber 10 and the second chamber 30. Thus, the first electrolyte 18 disposed within the first chamber 10 would not be introduced into the second chamber 30.

In addition, according to some embodiments of the disclosure, the first electrolyte 18 disposed within the first chamber 10 would not be directly introduced into the second chamber 30 without being subjected to a treatment (such as isolation or purification). According to embodiments of the disclosure, the positive electrode 10 can include a current-collecting layer and an active material disposed on the current-collecting layer (not shown). According to embodiments of the disclosure, the positive electrode 10 can consist of the current-collecting layer and the active material.

According to embodiments of the disclosure, the current-collecting layer can be a conductive carbon substrate, such as carbon cloth, carbon felt, or carbon paper. For example, the conductive carbon substrate can have a sheet resistance from about 1 $m\Omega \cdot cm^2$ to 6 $m\Omega \cdot cm^2$ and a carbon content of greater than 65 wt %.

The active material can include a layered active layer or an agglomeration of the layered active layer. According to embodiments of the disclosure, the active material can be an intercalated carbon material, such as graphite (including natural graphite, artificial graphite, mesophase carbon microbeads, pyrolytic graphite, foaming graphite, flake graphite, or expanded graphite), graphene, carbon nanotube or a combination thereof. According to embodiments of the disclosure, the active material can be layered double hydroxide, layered oxide, layered chalcogenide or a combination thereof. The active layer can have a porosity between about 0.05 and 0.95, such as between about 0.3 and 0.9. The active material can grow directly on the current-collecting layer (i.e. there is no other layer between the active layer and the current-collecting layer). Furthermore, the active material can be affixed to the current-collecting layer via an adhesive.

The material of the separator 14 can be glass fiber, polyethylene (PE), polypropylene (PP), nonwoven fabric, wood fiber, polyether sulfones (PES), ceramic fiber or a combination thereof.

According to embodiments of the disclosure, the negative electrode 16 can consist of a metal or an alloy thereof. In particular, the metal can be aluminum, copper, iron, zinc, cobalt, indium, nickel, tin, chromium, lanthanum, yttrium, titanium, manganese, tungsten, tantalum, or molybdenum. In addition, the negative electrode 16 can further include a current-collecting layer (not shown), and the metal or the alloy thereof is disposed on the current-collecting layer.

According to embodiments of the disclosure, the metal or the alloy thereof can grow directly on the current-collecting layer (i.e. there is no other layer between the metal or the alloy thereof and the current-collecting layer). Furthermore, the metal or the alloy thereof can be affixed to the current-collecting layer via an adhesive.

According to some embodiments of the disclosure, the metal can be a metal which has a lower reduction potential than aluminum, thereby solving the problem of the negative electrode corrosion of the metal-ion battery.

According to embodiments of the disclosure, the first electrolyte 18 can include a first ionic liquid and a first metal halide. The first ionic liquid can be an ionic liquid which is suitable for use in a metal-ion battery.

For example, the first ionic liquid can include ammonium salt (such as alkylammonium salt), azaannulenium salt (such as alkylazaannulenium salt), azathiazolium salt (such as alkylazathiazolium salt), benzimidazolium salt (such as alkylbenzimidazolium salt), benzofuranium salt (such as alkylbenzofuranium salt), benzotriazolium salt (such as alkylbenzimidazolium salt), borolium salt (such as alkylborolium salt), cholinium salt (such as alkylcholinium salt), cinnolinium salt (such as alkylcinnolinium salt), diazabicyclodecenium salt (such as alkyldiazabicyclodecenium salt), diazabicyclononenium salt (such as alkyldiazabicyclononenium salt), diazabicyclo-undecenium salt (such as alkyldiazabicyclo-undecenium salt), dithiazolium salt (such as alkyldithiazolium salt), furanium salt (such as alkylfuranium salt), guanidinium salt (such as alkylguanidinium salt), imidazolium salt (such as alkylimidazolium salt), indazolium salt (such as alkylindazolium salt), indolinium salt (such as alkylindolinium salt), indolium salt (such as alkylindolium salt), morpholinium salt (such as alkylmorpholinium salt), oxaborolium salt (such as alkyloxaborolium salt), oxaphospholium salt (such as alkyloxaphospholium salt), oxazinium salt (such as alkyloxazinium salt), oxazolium salt (such as alkyloxazolium salt), iso-oxazolium salt (such as iso-alkyloxazolium salt), oxathiazolium salt (such as alkyloxathiazolium salt), pentazolium salt (such as alkylpentazolium salt), phospholium salt (such as alkylphospholium salt), phosphonium salt (such as alkylphosphonium salt), phthalazinium salt (such as alkylphthalazinium salt)), piperazinium salt (such as alkylpiperazinium salt), piperidinium salt (such as alkylpiperidinium salt), pyranium salt (such as alkylpyranium salt), pyrazinium salt (such as alkylpyrazinium salt), pyrazolium salt (such as alkylpyrazolium salt), pyridazinium salt (such as alkylpyridazinium salt), pyridinium salt (such as alkylpyridinium salt), pyrimidinium salt (such as alkylpyrimidinium salt), pyrrolidinium salt (such as alkylpyrrolidinium salt), pyrrolium salt (such as alkylpyrrolium salt), quinazolinium salt (such as alkylquinazolinium salt), quinolinium salt (such as alkylquinolinium salt), iso-quinolinium salt (such as iso-alkylquinolinium salt), quinoxalinium salt (such as alkylquinoxalinium salt), selenozolium salt (such as alkylselenozolium salt), sulfonium salt (such as alkylsulfonium salt), tetrazolium salt (such as alkyltetrazolium salt), iso-thiadiazolium salt (such as iso-alkylthiadiazolium salt), thiazinium salt (such as alkylthiazinium salt), thiazolium salt (such as alkylthiazolium salt), thiophenium salt (such as alkylthiophenium salt), thiuronium salt (such as alkylthiuronium salt), triazadecenium salt (such as alkyltriazadecenium salt), triazinium salt (such as alkyltriazinium salt), triazolium salt (such as alkyltriazolium salt), iso-triazolium salt (such as iso-alkyltriazolium salt), or uronium salt (such as alkyluronium salt), or a combination thereof.

According to some embodiments of the disclosure, the first ionic liquid can be methylimidazolium chloride, 1-ethyl-3-methylimidazolium chloride, 1-butyl-3-methylimidazolium chloride), cholinium chloride, or a combination thereof.

According to embodiments of the disclosure, the metal halide can include a metal fluoride, a metal chloride, or a metal bromide serving as a Lewis acid, in order to provide a reversible electrolyte system.

In addition, in order to increase the total capacity generation of the metal-ion battery and suppress the thermal runaway of the metal-ion battery during charging and discharging, the first metal halide is not alkaline halide or alkaline earth halide. The first metal halide can include aluminum halide (such as aluminum fluoride, aluminum chloride, or aluminum bromide), silver halide (such as silver fluoride, silver chloride, or silver bromide), copper halide (such as copper fluoride, copper chloride, or copper bromide), iron halide (such as iron fluoride, iron chloride, or iron bromide), cobalt halide (such as cobalt fluoride, cobalt chloride, or cobalt bromide), zinc halide (such as zinc fluoride, zinc chloride, or zinc bromide), indium halide (such as indium fluoride, indium chloride, or indium bromide), cadmium halide (such as cadmium fluoride, cadmium chloride, or cadmium bromide), nickel halide (such as nickel fluoride, nickel chloride, or nickel bromide), tin halide (such as tin fluoride, tin chloride, or tin bromide), chromium halide (such as chromium fluoride, chromium chloride, or chromium bromide), lanthanum halide (such as lanthanum fluoride, lanthanum chloride, or lanthanum bromide), yttrium halide (such as yttrium fluoride, silver chloride, or yttrium bromide), titanium halide (such as titanium fluoride, titanium chloride, or titanium bromide), manganese halide (such as manganese fluoride, manganese chloride, or manganese bromide), molybdenum halide (such as molybdenum fluoride, molybdenum chloride, or molybdenum bromide), or a combination thereof. Herein, the metal halide of the disclosure can include at least one metal halide with various valences. For example, copper chloride of the disclosure can be $CuCl$, $CuCl_2$, or a combination thereof; iron chloride can be $FeCl_2$, $FeCl_3$, or a combination thereof; cobalt chloride can be $CoCl_3$, $CoCl_2$, or a combination thereof; chromium chloride can be $CrCl_2$, $CrCl_3$, or a combination thereof; zinc chloride can be $ZnCl_2$, $ZnCl_4$, or a combination thereof; tin chloride can be $SnCl_2$, $SnCl_4$, or a combination thereof; and, manganese chloride can be $MnCl_2$, $MnCl_3$, or a combination thereof.

According to embodiments of the disclosure, the electrolyte can further include an additive to increase electrical conductivity and lower the viscosity. Furthermore, the electrolyte can be modified by other method for obtaining an advantageously reversible electrolyte system.

According to embodiments of the disclosure, in the initial state (i.e. in the beginning of the operation of the metal-ion battery) of the first electrolyte 18, the molar ratio of the first metal halide to the first ionic liquid is from about 1.1:1 to 1.8:1, such as from about 1.2:1 to 1.75:1, from about 1.3:1 to 1.7:1, from about 1.35:1 to 1.6:1, or from about 1.4:1 to 1.5:1.

According to embodiments of the disclosure, the second electrolyte 38 can include a second metal halide, wherein the second metal halide can have the same definition as that given for the first metal halide. According to embodiments of the disclosure, the first metal halide and the second metal halide can be the same or different. According to some embodiments of the disclosure, the second electrolyte 38 consists of the second metal halide. In addition, the second electrolyte 38 can include the second metal halide and a second ionic liquid, wherein the second ionic liquid can have the same definition as that given for the first ionic liquid. According to embodiments of the disclosure, the first ionic liquid and the second ionic liquid can be the same or different. Herein, the molar ratio of the second metal halide to the second ionic liquid can be greater than the molar ratio of the first metal halide to the first ionic liquid. For example, the molar ratio of the second metal halide to the second ionic liquid is from about 1.5:1 to 10:1, such as from about 1.6:1 to 10:1, from about 1.7:1 to 9:1, from about 1.8:1 to 8.5:1, or from about 2:1 to 5:1. And, the molar ratio of the second metal halide to the second ionic liquid is different from the molar ratio of the first metal halide to the first ionic liquid.

According to embodiments of the disclosure, the first electrolyte 18 includes aluminum chloride ($AlCl_3$) and 1-ethyl-3-methylimidazolium chloride, and the second electrolyte is aluminum chloride. In particular, in the first electrolyte 18, the molar ratio of the aluminum chloride to the 1-ethyl-3-methylimidazolium chloride can be from about 1.3:1 to 1.65:1 (such as about 1.3:1, 1.4:1, 1.5:1, 1.6:1, or 1.65:1). Therefore, the metal-ion battery 100 can be operated at a normal temperature (such as from about 0 to 40° C. when the concentration (i.e. the molar ratio of the aluminum chloride to the 1-ethyl-3-methylimidazolium chloride) of the first electrolyte 18 corresponds to the initial set value. When a user has to operate the metal-ion battery at a lower temperature (such as lower than −35° C.) or when the metal-ion battery has a reduced capacity after operating for a period of time, the user can introduce the second electrolyte 38 disposed within the second chamber 30 into the first chamber 10 via the control element 20, so that the metal-ion battery 100 can work normally. The second electrolyte 38 can consist of aluminum chloride. Furthermore, the second electrolyte 38 can consist of aluminum chloride and 1-ethyl-3-methylimidazolium chloride, wherein the components and/or concentration of the first electrolyte are different from those of the second electrolyte. According to embodiments of the disclosure, the control element 20 can be a quantitative control screw rod conveyance or quantitative control pressure delivery element for introducing the second electrolyte into the first chamber.

Figure 2:
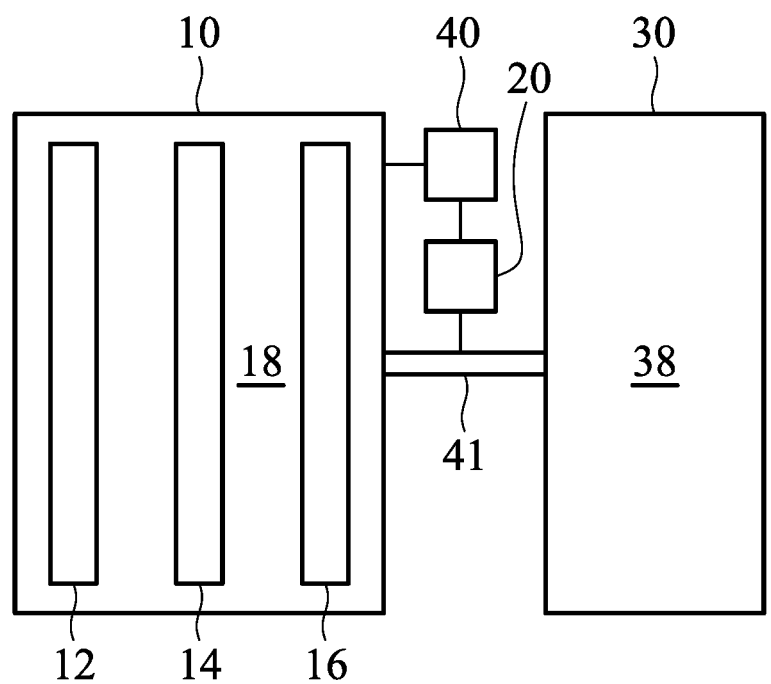
FIG. 2 is a block schematic diagram of a metal-ion battery according to another embodiment of the disclosure.

FIG. 2 is a block schematic diagram of a metal-ion battery 100 according to another embodiment of the disclosure. As shown in FIG. 2, the metal-ion battery 100 can further include a sensor element 40 for monitoring the conductivity, temperature, specific gravity, or viscosity of the first electrolyte 18 disposed in the first chamber. In addition, the value (such as conductivity, temperature, specific gravity, or viscosity of the first electrolyte 18) obtained by the sensor element 40 is transferred to the control element 20. According to embodiments of the disclosure, the control element 20 can include a comparison circuitry for comparing the value obtained by the sensor element 40 with a predetermined value, in order to determine whether to introduce the second electrolyte 38 disposed within the second chamber 30 into the first chamber 10 via a first pipeline 41.

Figure 3:
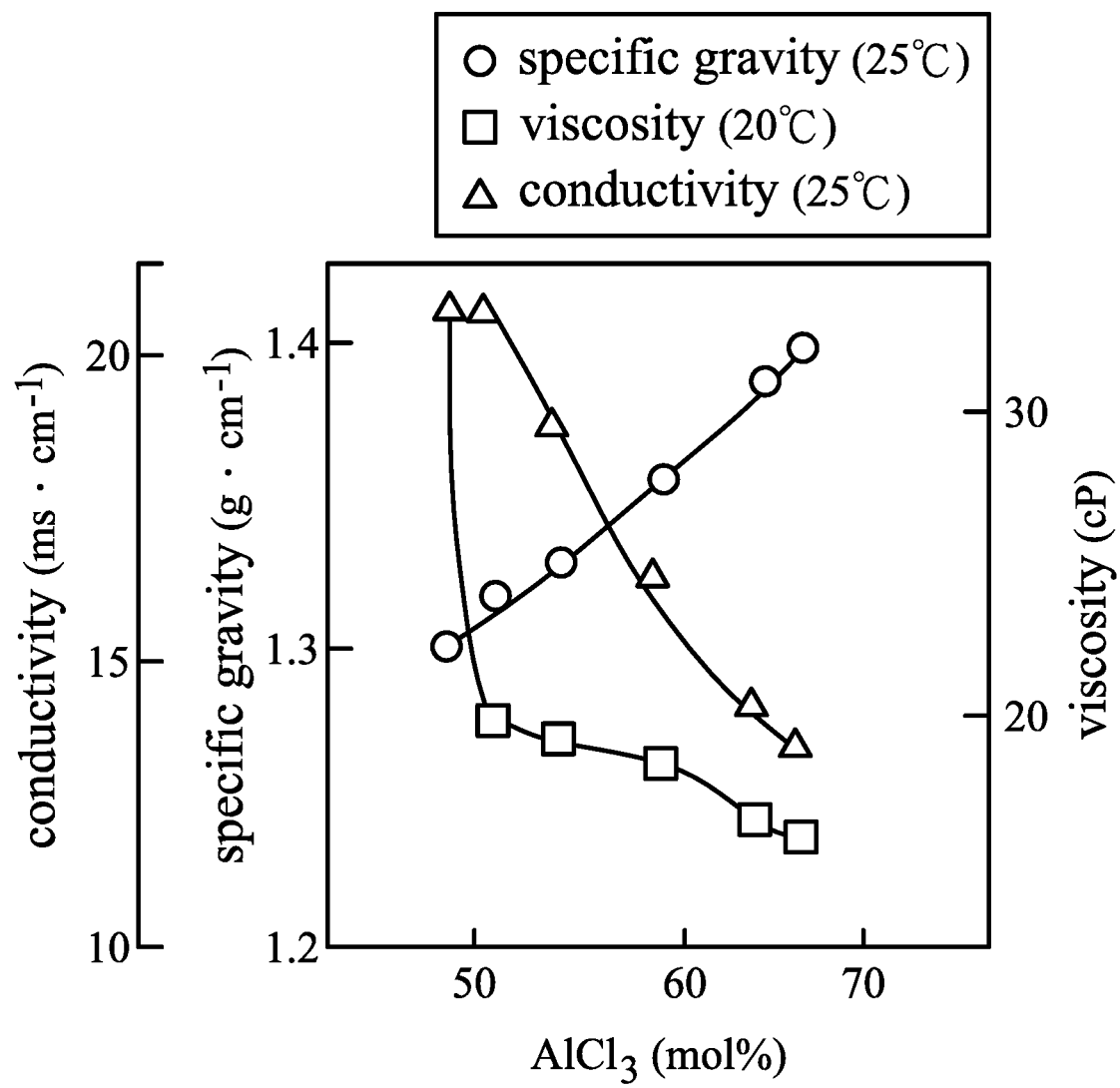
FIG. 3 is a graph plotting the relationship between the aluminum chloride concentration and the conductivity, specific gravity, or viscosity.

FIG. 3 is a graph plotting the relationship between the aluminum chloride concentration and the conductivity, specific gravity, or viscosity of the electrolyte (including aluminum chloride and 1-ethyl-3-methylimidazolium chloride). As shown in FIG. 3, the user can determine the predetermined value of the comparison circuitry according to the desirable aluminum chloride concentration and the value (conductivity, specific gravity, or viscosity) corresponding thereto. For example, when the conductivity, or viscosity of the first electrolyte 18 is greater than the predetermined value, the control element 20 introduces the second electrolyte 38 within the second chamber 30 into the first chamber 10 via the first pipeline 41. Furthermore, when the temperature or the specific gravity of the first electrolyte 18 is less than a predetermined value, the control element 20 introduces the second electrolyte 38 within the second chamber 30 into the first chamber 10 via the first pipeline 41. According to some embodiments of the disclosure, the control element 20 can include a pump in order to introduce the second electrolyte 38 disposed within the second chamber 30 into the first chamber 10 via the first pipeline 41.

Figure 4:
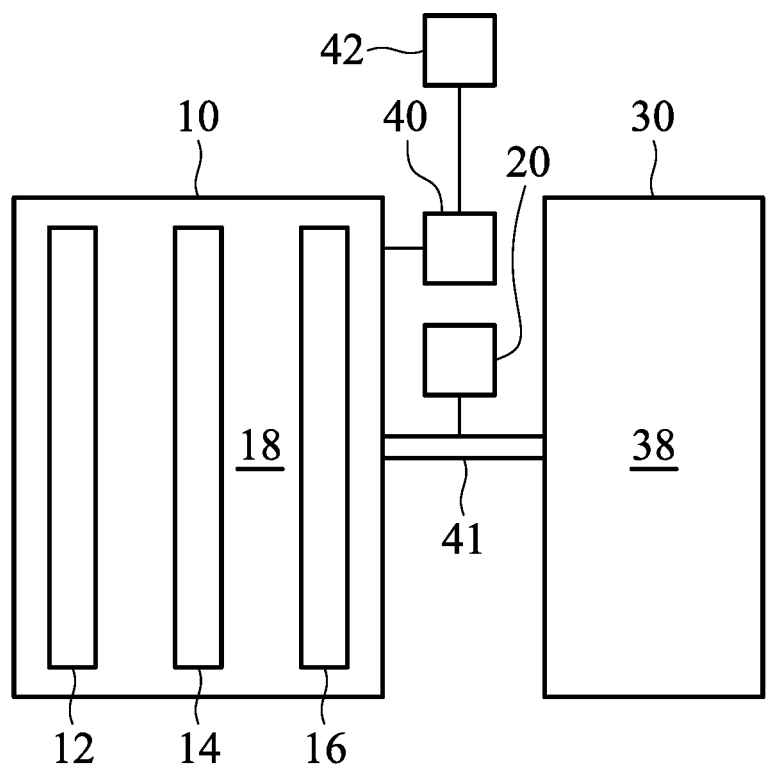
FIGS. 4-6 are block schematic diagrams of metal-ion batteries according to other embodiments of the disclosure.

FIG. 4 is a block schematic diagram of metal-ion battery 100 according to another embodiment of the disclosure. As shown in FIG. 4, the sensor element 40 of the metal-ion battery 100 connects to a display element 42. The display element 42 shows the value (such as conductivity, temperature, specific gravity, or viscosity) of the first electrolyte 18 measured by the sensor element 40. Thus, the user can utilize the control element 20 to introduce the second electrolyte 38 (such as aluminum chloride) disposed within the second chamber 30 into the first chamber 10 according to the information shown in the display element 42.

Figure 5:
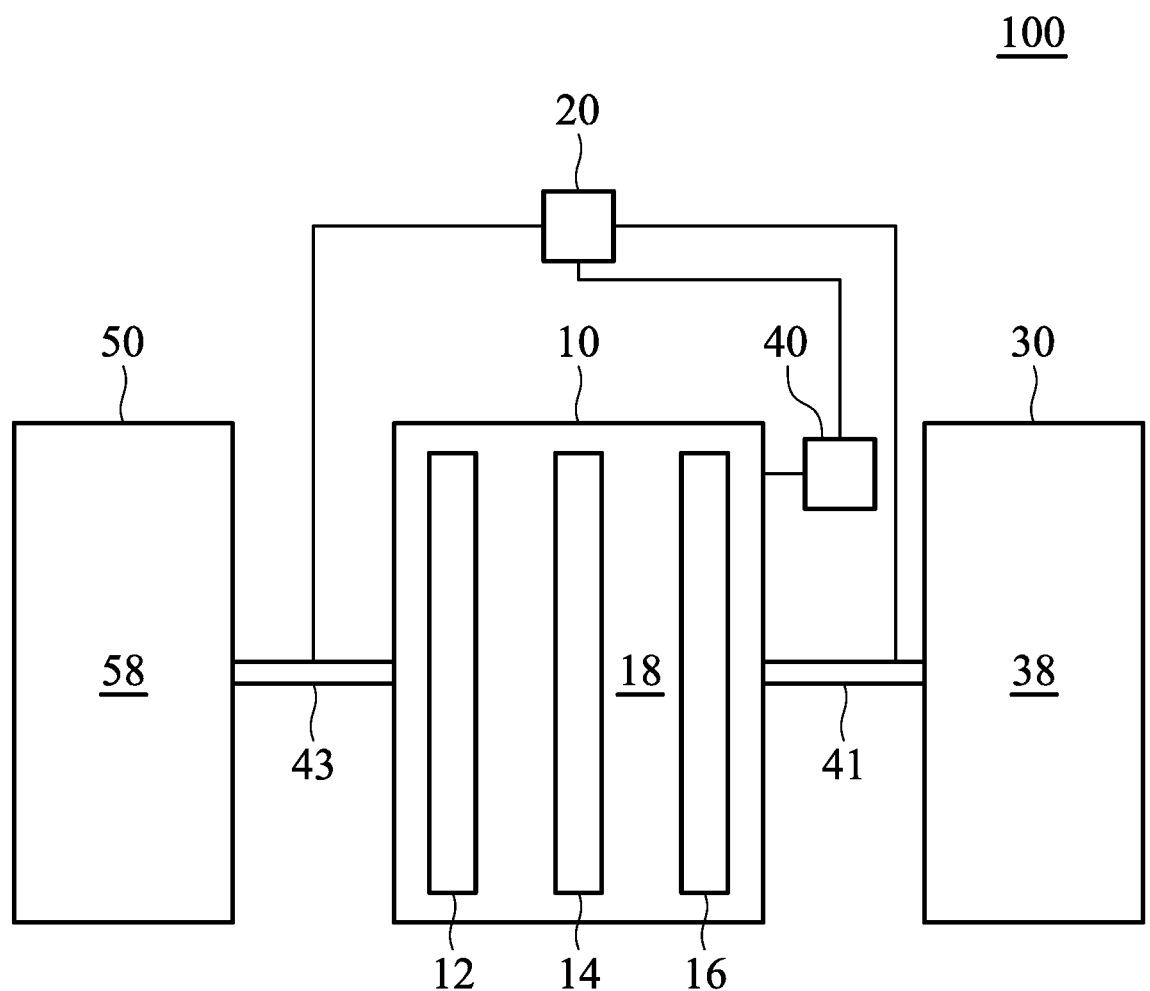

FIG. 5 is a block schematic diagram of metal-ion battery 100 according to another embodiment of the disclosure. As shown in FIG. 5, the metal-ion battery 100 can include a third chamber 50, wherein a third electrolyte 58 is disposed within the third chamber 58. It should be noted that components and/or concentration of the first electrolyte, second electrolyte and third electrolyte are different from each other. The control element 20 can determine whether to introduce the third electrolyte 58 disposed within the third chamber 50 into the first chamber 10 via the second pipeline 43. According to embodiments of the disclosure, the third electrolyte 58 can include a third ionic liquid, wherein the third ionic liquid can have the same definition as that given for the first ionic liquid. According to embodiments of the disclosure, the first ionic liquid and the third ionic liquid can be the same or different.

According to some embodiments of the disclosure, the third electrolyte 58 consists of the third ionic liquid. In addition, the third electrolyte 58 can include a third metal halide and a third ionic liquid, wherein the third metal halide can have the same definition as that given for the first metal halide. According to embodiments of the disclosure, the third metal halide and the first metal halide can be the same or different. Herein, the molar ratio of the third metal halide to the third ionic liquid can be less than the molar ratio of the first metal halide to the first ionic liquid. For example, the molar ratio of the third metal halide to the third ionic liquid is from about 0.1:1 to 0.9:1, such as from about 0.2:1 to 0.8:1, from about 0.3:1 to 0.7:1, or from about 0.4:1 to 0.6:1.

According to embodiments of the disclosure, the first electrolyte 18 can include aluminum chloride ($AlCl_3$) and 1-ethyl-3-methylimidazolium chloride, the second electrolyte is aluminum chloride, and the third electrolyte is 1-ethyl-3-methylimidazolium chloride. In particular, in the first electrolyte 18, the molar ratio of the aluminum chloride to the 1-ethyl-3-methylimidazolium chloride can be from about 1.3:1 to 1.65:1 (such as 1.3:1, 1.4:1, 1.5:1, 1.6:1, or 1.65:1). Thus, the metal-ion battery 100 can be operated at a normal temperature (such as from about 0 to 40° C. when the concentration (i.e. the molar ratio of the aluminum chloride to the 1-ethyl-3-methylimidazolium chloride) of the first electrolyte 18 corresponds to the initial set value.

When a user has to operate the metal-ion battery at a lower temperature (such as lower than −35° C.) or when the metal-ion battery has a reduced capacity after operating for a period of time, the user can introduce the second electrolyte 38 disposed within the second chamber 30 into the first chamber 10 via the control element 20, so that the metal-ion battery 100 can work normally. In addition, when the ambient temperature rises to a normal temperature (such as from about 0 to 40° C.) or when the metal-ion battery has a reduced capacity after operating for a period of time, the user can introduce the third electrolyte 58 disposed within the third chamber 50 into the first chamber 10 via the control element 20, so that the metal-ion battery 100 can work normally. The third electrolyte 58 can consist 1-ethyl-3-methylimidazolium chloride. Furthermore, the third electrolyte 58 can consist aluminum chloride and the 1-ethyl-3-methylimidazolium chloride.

According to embodiments of the disclosure, as shown in FIG. 5, the sensor element 40 can be used to monitor the conductivity, temperature, specific gravity, or viscosity of the first electrolyte 18 disposed in the first chamber 10. In addition, the value (such as conductivity, temperature, specific gravity, or viscosity of the first electrolyte 18) obtained by the sensor element 40 is transferred to the control element 20. According to embodiments of the disclosure, the control element 20 can include a comparison circuitry for comparing the value obtained by the sensor element 40 with a predetermined value, in order to determine whether to introduce the third electrolyte 58 disposed within the third chamber 50 into the first chamber 10 via a second pipeline 43.

For example, when the conductivity, or viscosity of the first electrolyte 18 is less than the predetermined value, the control element 20 introduces the third electrolyte 58 within the third chamber 50 into the first chamber 10 via the second pipeline 43. Furthermore, when the temperature or the specific gravity of the first electrolyte 18 is greater than a predetermined value, the control element 20 introduces the third electrolyte 58 within the third chamber 50 into the first chamber 10 via the second pipeline 43.

According to embodiments of the disclosure, the second pipeline 43 can be a unidirectional pipeline. Namely, the electrolyte merely flows into the first chamber 10 from the third chamber 50 via the second pipeline 43. The electrolyte within the first chamber 10 cannot flow into the third chamber 50 via the second pipeline 43. Namely, the second pipeline 43 is a flow-in pipeline with respect to the first chamber 10, and the second pipeline 43 is a flow-out pipeline with respect to the third chamber 50. As a result, the third electrolyte 58 disposed within the third chamber 50 can be introduced into the first chamber 10 via the second pipeline 43, and the first electrolyte 18 disposed within the first chamber 10 cannot be introduced into the third chamber 50 via the second pipeline 43.

In addition, according to embodiments of the disclosure, the components and/or concentration of the electrolyte disposed within the first chamber 10 can be adjusted by introducing the third electrolyte 58 disposed within the third chamber 50 into the first chamber 10. Therefore, except for the second pipeline 43, there is no other pipeline between the first chamber 10 and the third chamber 30 for the electrolyte to proceed from the first chamber 10 to the second chamber 30. Namely, there is no flow-out pipeline (with respect to the first chamber 10) between the first chamber 10 and the third chamber 50. Thus, the first electrolyte 18 disposed within the first chamber 10 would not be introduced into the third chamber 50. In addition, according to some embodiments of the disclosure, the first electrolyte 18 disposed within the first chamber 10 would not be directly introduced into the third chamber 50 without being subjected to a treatment (such as isolation or purification).

Figure 6:
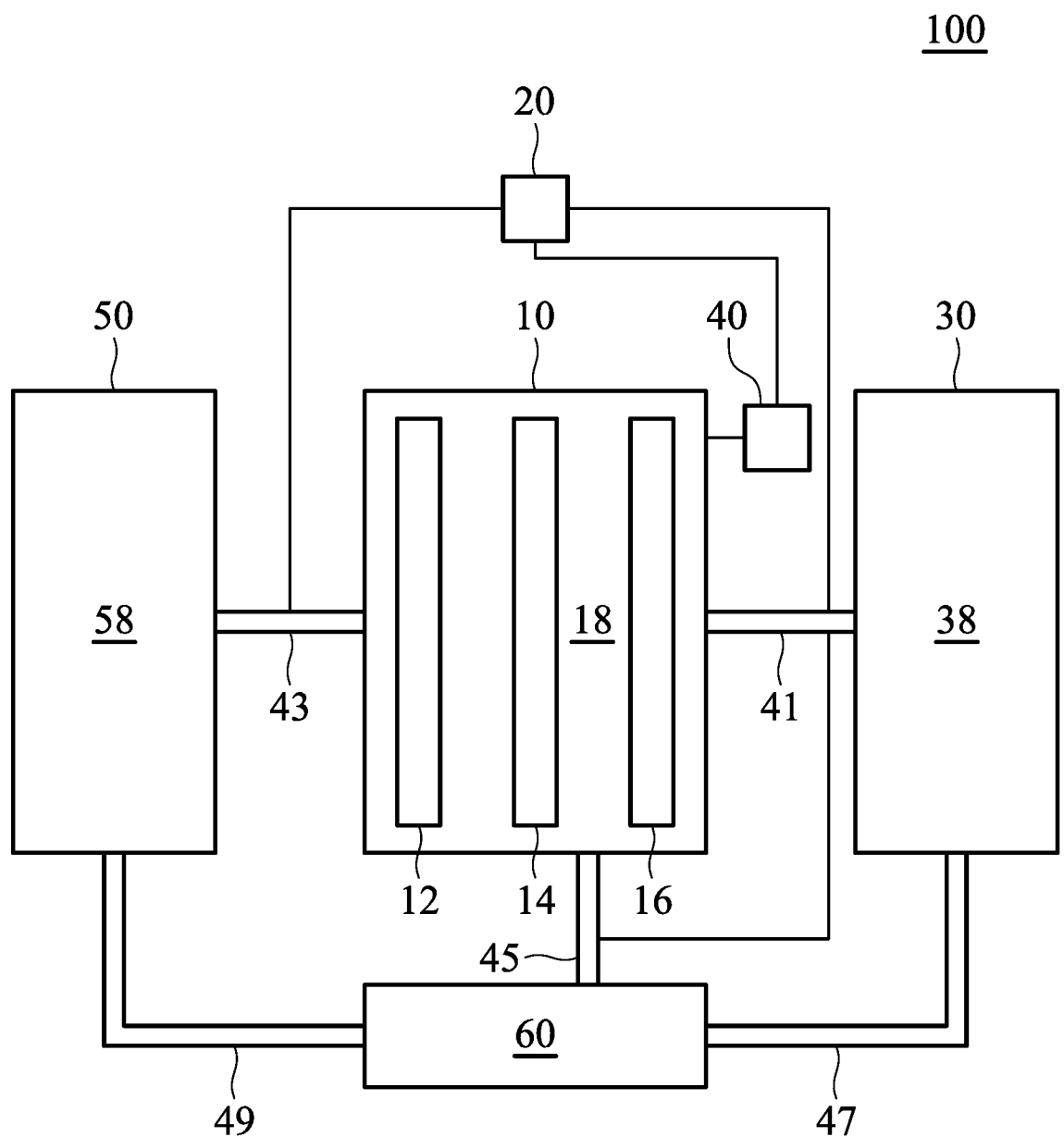

FIG. 6 is a block schematic diagram of metal-ion battery 100 according to other embodiments of the disclosure. As shown in FIG. 6, the metal-ion battery 100 can further include a filter element 60, and the control element 20 can determine whether to introduce the first electrolyte 18 disposed within the first chamber 10 into the filter element 60 via a third pipeline 45. The filter element 60 can separate the first electrolyte 18 into the second electrolyte 38 and the third electrolyte 58. The obtained second electrolyte 38 can be introduced into the second chamber 30 via a fourth pipeline 47, and the obtained third electrolyte 58 can be introduced into the third chamber via a fifth pipeline 49 in order to supplement the second electrolyte 38 and the third electrolyte 58.

According to embodiments of the disclosure, the filter element 60 can include a filter material, wherein suitable materials of the filter material can be Nylon, polytetrafluoroethene (PTFE), polyether sulfone (PES), mixed cellulose ester (MCE), polyfluortetraethylene (PVDF), acetate cellulose (CA), glass fiber (GF), polypropylene (PP), polyethylene (PE), porous ceramic (such as anodic aluminum oxide, AAO), or zirconium oxide ($ZrO_2$)), or a combination thereof. According to embodiments of the disclosure, the first electrolyte 18 can include aluminum chloride ($AlCl_3$) and 1-ethyl-3-methylimidazolium chloride, the second electrolyte is aluminum chloride and the third electrolyte is 1-ethyl-3-methylimidazolium chloride. For example, when the weight of the first electrolyte 18 (monitored by the sensor element 40) is greater than a predetermined value, the sensor element 40 may send a signal to the control element 20. Thus, the control element 20 can introduce the excess first electrolyte 18 into the filter element 60 via the third pipeline 45.

The filter element 60 can separate the first electrolyte 18 into aluminum chloride ($AlCl_3$) and 1-ethyl-3-methylimidazolium chloride. The obtained aluminum chloride ($AlCl_3$) can be introduced into the second chamber 30 via the fourth pipeline 47, and the obtained 1-ethyl-3-methylimidazolium chloride can be introduced into the third chamber via the fifth pipeline 49.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

An aluminum foil (with a thickness of 0.025 mm) was cut to obtain an aluminum electrode. Next, a separator (two layers with trade No. Whatman GFA) was provided. Next, a graphite electrode (including an active layer disposed on a current-collecting substrate, wherein the current-collecting substrate was carbon fiber paper, and the active layer was expanded graphite (95 mg)) was provided. Next, the aluminum electrode (serving as the negative electrode), the separator, and the graphite electrode (serving as the positive electrode) were placed in sequence and sealed within an aluminum plastic pouch. Next, 9 ml of a first electrolyte (consisting of aluminum chloride ($AlCl_3$) and 1-ethyl-3-methylimidazolium chloride ([EMIm]Cl), wherein the molar ratio of AlCl3 to [EMIm]Cl was about 1.4:1) was injected into the aluminum plastic pouch, obtaining Metal-ion battery (1). Next, a second electrolyte (consisting of aluminum chloride ($AlCl_3$) and 1-ethyl-3-methylimidazolium chloride ([EMIm]Cl), wherein the molar ratio of $AlCl_3$ to [EMIm]Cl was about 2.0:1) was provided.

Figure 7:
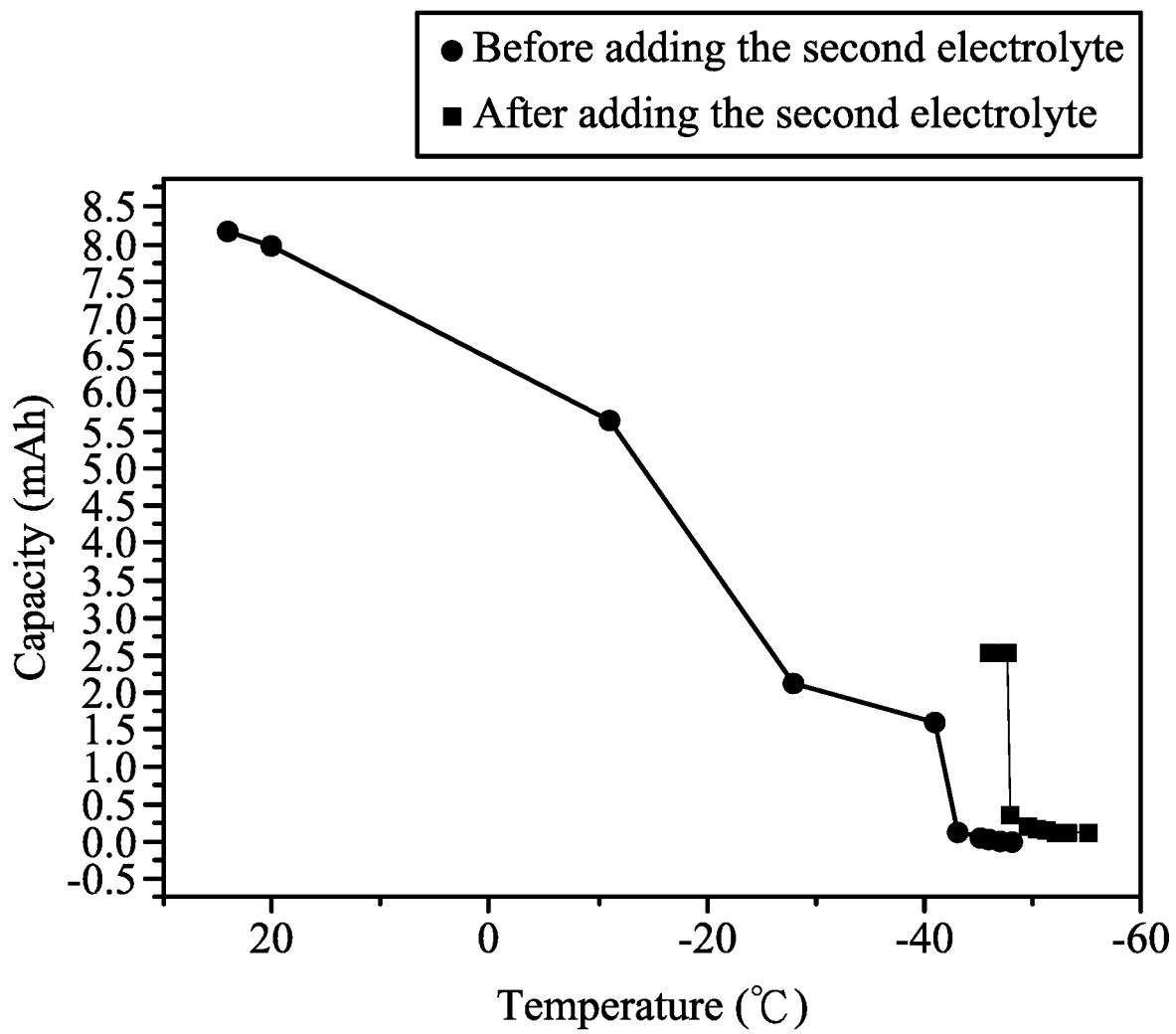
FIG. 7 is a graph plotting the operating temperature against the capacity of Metal-ion battery (1) according to Example 1.

Next, the capacity of Metal-ion battery (1) was measured at a current density of about 100 mA/g under various temperatures, and the results are shown in FIG. 7. As shown in FIG. 7, the capacity of Metal-ion battery (1) measured at −10° C. was approximately 0.7 times the capacity of Metal-ion battery (1) measured at 25° C. The capacity of Metal-ion battery (1) measured at −27° C. was approximately 0.24 times the capacity of Metal-ion battery (1) measured at 25° C. The capacity of Metal-ion battery (1) measured at −40° C. was approximately 0.21 times the capacity of Metal-ion battery (1) measured at 25° C. And, The capacity of Metal-ion battery (1) measured at a temperature less than −40° C. was approximately zero.

Next, 1 ml of the second electrolyte was injected into Metal-ion battery (1) at −50° C. (capacity was approximately zero), and then the capacity of Metal-ion battery (1) was measured at the current density of about 100 mA/g again. The result is shown in FIG. 7. As shown in FIG. 7, when adding the second electrolyte into Metal-ion battery (1), an exothermic reaction was observed and the temperature of Metal-ion battery (1) was raised from −50° C. to about −38° C. Next, the temperature of Metal-ion battery (1)

reduced rapidly toward −50° C. (ambient temperature). As shown in FIG. 7, after adding the second electrolyte ($AlCl_3$-rich electrolyte), the blocking temperature was reduced from −40° C. to −47° C., and Metal-ion battery (1) failed after cooling to −47° C.

Example 2

An aluminum foil (with a thickness of 0.025 mm) was cut to obtain an aluminum electrode. Next, a separator (two layers with trade No. Whatman GFA) was provided. Next, a graphite electrode (including an active layer disposed on a current-collecting substrate, wherein the current-collecting substrate was carbon fiber paper, and the active layer was expanded graphite (95 mg)) was provided. Next, the aluminum electrode (serving as the negative electrode), the separator, and the graphite electrode (serving as the positive electrode) were placed in sequence and sealed within an aluminum plastic pouch. Next, 9 ml of a first electrolyte (consisting of aluminum chloride ($AlCl_3$) and 1-ethyl-3-methylimidazolium chloride ([EMIm]Cl), wherein the molar ratio of $AlCl_3$ to [EMIm]Cl was about 1.65:1) was injected into the aluminum plastic pouch, obtaining Metal-ion battery (2).

Next, a second electrolyte (consisting of aluminum chloride ($AlCl_3$) and 1-ethyl-3-methylimidazolium chloride ([EMIm]Cl), wherein the molar ratio of $AlCl_3$ to [EMIm]Cl was about 2.0:1) was provided.

Figure 8:
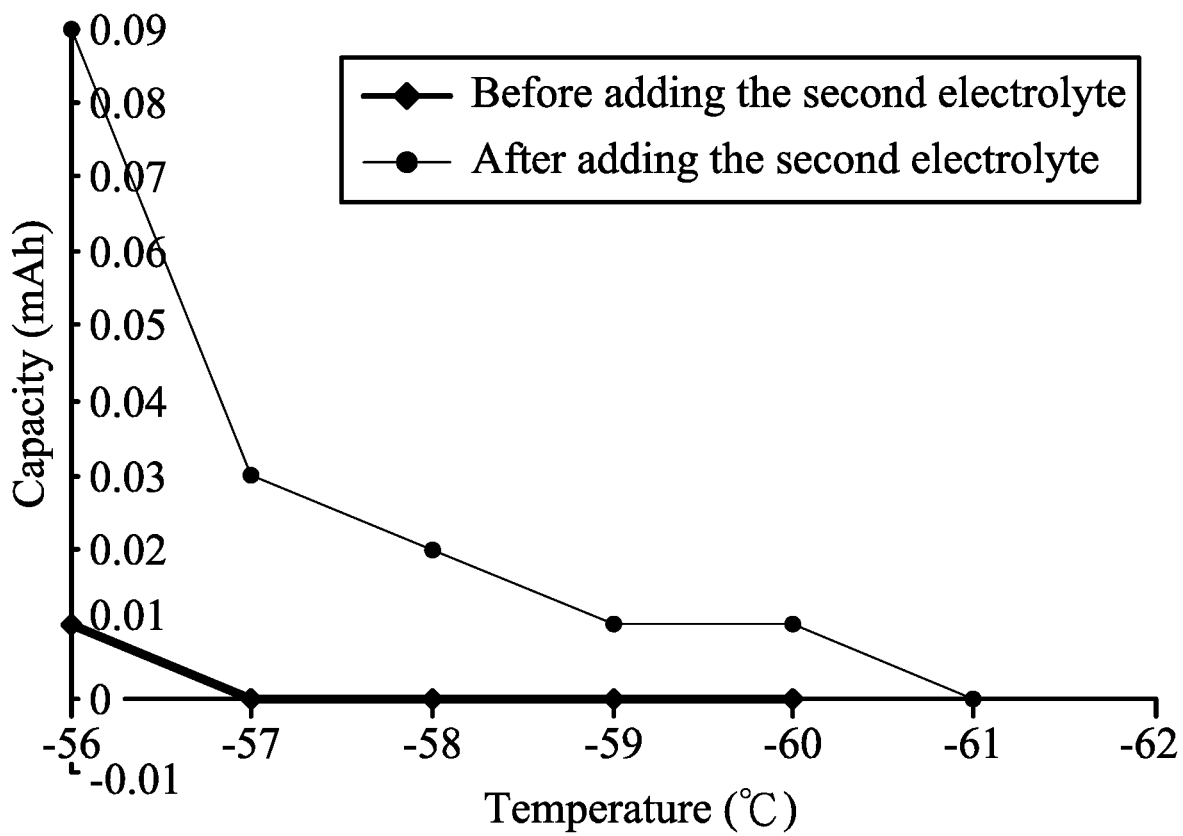
FIG. 8 is a graph plotting the operating temperature against the capacity of Metal-ion battery (2) according to Example 2.

Next, the capacity of Metal-ion battery (2) was measured at a current density of about 100 mA/g under various temperatures, and the results are shown in FIG. 8. As shown in FIG. 8, the capacity of Metal-ion battery (2) measured at −56° C. was approximately zero.

Next, 1 ml of the second electrolyte was injected into Metal-ion battery (2) at −60° C. (capacity was approximately zero), and then the capacity of Metal-ion battery (2) was measured at the current density of about 100 mA/g again. The result is shown in FIG. 8. As shown in FIG. 8, when adding the second electrolyte into Metal-ion battery (2), an exothermic reaction was observed and the temperature of Metal-ion battery (2) was raised from −60° C. to about −40° C. Next, the temperature of Metal-ion battery (2) reduced rapidly to −60° C. (ambient temperature). As shown in FIG. 8, after adding the second electrolyte ($AlCl_3$-rich electrolyte), the blocking temperature was reduced from −57° C. to −61° C., and Metal-ion battery (2) failed after cooling to −61° C.

In addition, the capacity of Metal-ion battery (2), into which 1 ml of the second electrolyte ($AlCl_3$-rich electrolyte) was injected, measured at −56° C. was 9 times the capacity of Metal-ion battery (2) without addition of the second electrolyte, measured at −56° C.

Example 3

An aluminum foil (with a thickness of 0.025 mm) was cut to obtain an aluminum electrode. Next, a separator (two layers with trade No. Whatman GFA) was provided. Next, a graphite electrode (including an active layer disposed on a current-collecting substrate, wherein the current-collecting substrate was carbon fiber paper, and the active layer was expanded graphite (44 mg)) was provided. Next, the aluminum electrode (serving as the negative electrode), the separator, and the graphite electrode (serving as the positive electrode) were placed in sequence and disposed within a first chamber. Next, 9 ml of a first electrolyte (consisting of aluminum chloride ($AlCl_3$), ferrous chloride ($FeCl_2$) and 1-ethyl-3-methylimidazolium chloride ([EMIm]Cl), wherein the molar ratio of $AlCl_3$ and $FeCl_2$ to [EMIm]Cl was about 1.4:1, and the molar ratio of $FeCl_2$ to $AlCl_3$ was about 1:27) was added into the first chamber. Next, a second electrolyte (consisting of aluminum chloride ($AlCl_3$), ferrous chloride ($FeCl_2$) and 1-ethyl-3-methylimidazolium chloride ([EMIm]Cl), wherein the molar ratio of $AlCl_3$ to [EMIm]Cl was about 1.5:1, and the molar ratio of $FeCl_2$ to $AlCl_3$ was about 1:29) was added into a second chamber, obtaining Metal-ion battery (3).

Figure 9:
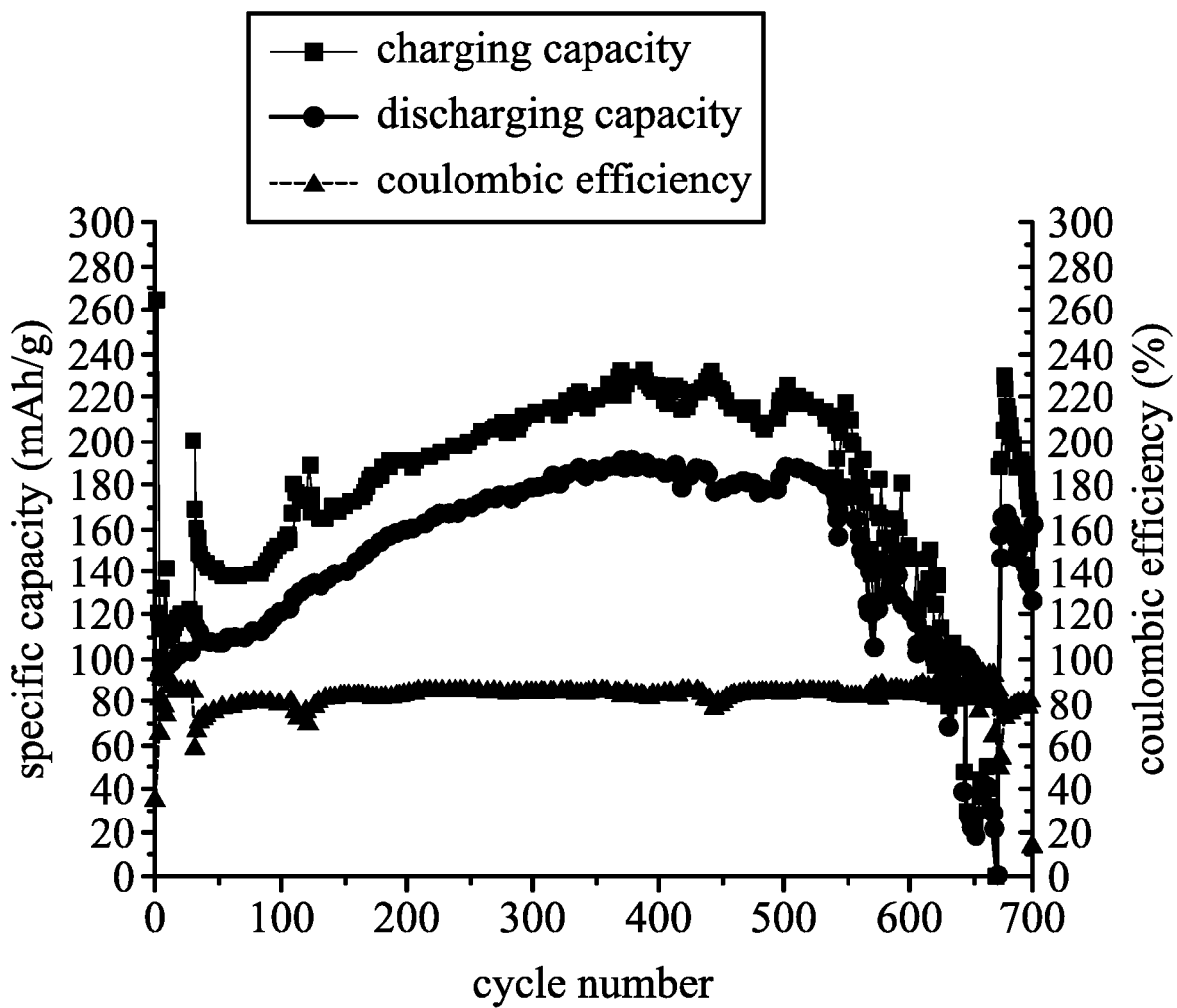
FIG. 9 is a graph showing the result of cycling stability tests of Metal-ion battery (3) according to Example (3).

Next, Metal-ion battery (3) was charged and discharged at a current density of about 44 mA/g by a battery analyzer to analyze the performance thereof, and the results are shown in FIG. 9. As shown in FIG. 9, Metal-ion battery (3) exhibited the best performance on the $380^{th}$ charging/discharging cycle. Herein, the conductivity of the electrolyte disposed within the first chamber was measured, and the molar ratio of $AlCl_3$ to [EMIm]Cl was measured by means of FIG. 3 and defined as the predetermined value. Next, a charge/discharge test of Metal-ion battery (3) was then performed. As shown in FIG. 9, the capacity of Metal-ion battery (3) was approximately 0 on the $670^{th}$ charging/discharging cycles.

Next, the second electrolyte disposed within the second chamber was introduced into the first chamber in order to force the concentration of the electrolyte to reach the predetermined value, and discharged charge/discharge test of Metal-ion battery (3) was then performed. As shown in FIG. 9, when introducing the second electrolyte into the first chamber to force the concentration of the electrolyte to reach the predetermined value, the capacity of Metal-ion battery (3) increased rapidly to match the capacity measured on the 380th charging/discharging cycle.

Accordingly, since an electrolyte with a distinct concentration from the initial electrolyte employed by the metal-ion battery of the disclosure can be introduced into the electrochemical reaction chamber, the performance of the metal-ion battery can be adjusted to an optimum value.

In addition, since an electrolyte, with a concentration different from the initial electrolyte employed by the metal-ion battery of the disclosure, can be introduced into the electrochemical reaction chamber, the molar ratio of the metal halide to the ionic liquid of the electrolyte can be reverted to the value at which the metal-ion battery exhibits highest performance. Thus, the capacity of the metal-ion battery of the disclosure can recover to the original capacity, thereby extending the lifetime of the metal-ion battery.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A metal-ion battery, comprising:
    a first chamber comprising a positive electrode, a negative electrode, a separator, and a first electrolyte disposed within the first chamber, wherein the separator is disposed between the positive electrode and the negative electrode, and wherein the first electrolyte comprises a first ionic liquid and a first metal halide;
    a second chamber comprising a second electrolyte disposed within the second chamber, wherein components and/or concentration of the first electrolyte are different from those of the second electrolyte, and wherein the second electrolyte comprises a second metal halide and a second ionic liquid;

a control element determining whether to introduce the second electrolyte disposed within the second chamber into the first chamber via a first pipeline, and wherein a molar ratio of the second metal halide to the second ionic liquid is greater than a molar ratio of the first metal halide to the first ionic liquid when the second electrolyte comprises the second metal halide and the second ionic liquid;

a sensor element, wherein the sensor element monitors a conductivity, temperature, specific gravity, or viscosity of the first electrolyte within the first chamber, and wherein sensor element presents an obtained value of conductivity, temperature, specific gravity, or viscosity to the control element;

a third chamber, wherein a third electrolyte is disposed within the third chamber, wherein components and/or concentration of the first electrolyte, second electrolyte and third electrolyte are different from each other, and wherein the control element determines whether to introduce the third electrolyte disposed within the third chamber into the first chamber via the second pipeline; and a filter element, wherein the control element determines whether to introduce the first electrolyte disposed within the first chamber into the filter element via a third pipeline, wherein the first electrolyte is divided into the second electrolyte and the third electrolyte by the filter element, and wherein the second electrolyte flows into the second chamber from the filter element via a fourth pipeline, and the third electrolyte flows into the third chamber from the filter element via a fifth pipeline.

2. The metal-ion battery as claimed in claim 1, wherein the molar ratio of the first metal halide to the first ionic liquid is from 1.1:1 to 1.8:1.

3. The metal-ion battery as claimed in claim 1, wherein the first metal halide is the same as the second metal halide.

4. The metal-ion battery as claimed in claim 1, wherein the first ionic liquid is the same as the second ionic liquid.

5. The metal-ion battery as claimed in claim 1, when the conductivity or the viscosity of the first electrolyte is greater than a predetermined value, the control element introduces the second electrolyte within the second chamber into the first chamber via the first pipeline.

6. The metal-ion battery as claimed in claim 1, wherein when the temperature or the specific gravity of the first electrolyte is less than a predetermined value, the control element introduces the second electrolyte within the second chamber into the first chamber via the first pipeline.

7. The metal-ion battery as claimed in claim 1, wherein the first pipeline is a unidirectional pipeline, thus the first electrolyte within the first chamber cannot flow into the second chamber via the first pipeline.

8. The metal-ion battery as claimed in claim 1, wherein there is no pathway for the first electrolyte to proceed from the first chamber to the second chamber.

9. The metal-ion battery as claimed in claim 1, wherein the first ionic liquid is the same as the third ionic liquid.

10. The metal-ion battery as claimed in claim 1, wherein the first metal halide is the same as the third metal halide.

11. The metal-ion battery as claimed in claim 1, wherein a molar ratio of the third metal halide to the third ionic liquid is less than the molar ratio of the first metal halide to the first ionic liquid.

12. The metal-ion battery as claimed in claim 1, wherein when the conductivity or the viscosity of the first electrolyte is less than a predetermined value, the control element introduces the third electrolyte within the third chamber into the first chamber via the second pipeline.

13. The metal-ion battery as claimed in claim 1, wherein when the temperature or the specific gravity of the first electrolyte is greater than a predetermined value, the control element introduces the third electrolyte within the third chamber into the first chamber via the second pipeline.

14. The metal-ion battery as claimed in claim 1, wherein the second pipeline is a unidirectional pipeline, thus the first electrolyte within the first chamber cannot flow into the third chamber via the second pipeline.

15. The metal-ion battery as claimed in claim 1, wherein there is no pathway for the first electrolyte to proceed from the first chamber to the third chamber.

16. The metal-ion battery as claimed in claim 1, wherein the second electrolyte comprises the second metal halide and the second ionic liquid and the molar ratio of the second metal halide to the second ionic liquid is from 1.5:1 to 10:1.

17. The metal-ion battery as claimed in claim 1, wherein the third electrolyte further comprising a third metal halide and a third ionic liquid, and wherein the molar ratio of the third metal halide to the third ionic liquid is from 0.1:1 to 0.9:1.

* * * * *